US00RE42110E

(19) United States
(12) Reissued Patent
Kehrer et al.

(10) Patent Number: US RE42,110 E
(45) Date of Reissued Patent: Feb. 8, 2011

(54) FIBROUS SHEET BINDERS

(75) Inventors: Kenneth P. Kehrer, Lancaster, PA (US); Sheldon M. Atlas, New York, NY (US); Helen Atlas, legal representative, New York, NY (US); Victor A. Kabanov, Omaha, NE (US); Alexander Kabanov, legal representative, Omaha, NE (US); Alexander Zezin, Moscow (RU); Valentine Rogachova, Moscow (RU)

(73) Assignee: AWI Licensing Company, Wilmington, DE (US)

(21) Appl. No.: 11/478,542

(22) Filed: Jun. 29, 2006

Related U.S. Patent Documents

Reissue of:

(64) Patent No.: 6,755,938
Issued: Jun. 29, 2004
Appl. No.: 09/933,408
Filed: Aug. 20, 2001

(51) Int. Cl.
*D21H 11/00* (2006.01)

(52) U.S. Cl. ..... 162/168.2; 162/168.3; 162/164.6; 162/164.1; 162/175; 162/178; 162/158; 525/34; 525/50; 524/13; 528/310; 528/332

(58) Field of Classification Search ..... None
See application file for complete search history.

(56) References Cited

U.S. PATENT DOCUMENTS

| | | | | | |
|---|---|---|---|---|---|
| 2,884,057 | A | * | 4/1959 | Padbury et al. | 162/164.6 |
| 2,890,978 | A | * | 6/1959 | Woodberry et al. | 525/332.9 |
| 2,963,396 | A | * | 12/1960 | Padbury et al. | 162/168.4 |
| 3,049,469 | A | * | 8/1962 | Davison | 162/164.3 |
| 3,303,184 | A | * | 2/1967 | Nordgren | 536/52 |
| 3,332,834 | A | * | 7/1967 | Reynolds, Jr. | 162/164.1 |
| 3,660,338 | A | * | 5/1972 | Economou | 524/417 |
| 3,677,888 | A | * | 7/1972 | Economou | 162/166 |
| 3,819,555 | A | * | 6/1974 | Kaufman | 524/555 |
| 3,840,489 | A | * | 10/1974 | Strazdins | 524/816 |
| 3,874,994 | A | * | 4/1975 | Sedlak | 162/163 |
| 3,875,097 | A | * | 4/1975 | Sedlak | 524/813 |
| 3,875,098 | A | * | 4/1975 | Sedlak | 524/512 |
| 4,002,588 | A | * | 1/1977 | Strazdins | 524/401 |
| 4,088,530 | A | * | 5/1978 | Chan et al. | 162/168.3 |
| 4,167,439 | A | * | 9/1979 | Killam | 162/163 |
| 4,299,654 | A | * | 11/1981 | Tlach et al. | 162/164.3 |
| 4,347,100 | A | * | 8/1982 | Brucato | 162/10 |
| 4,549,931 | A | * | 10/1985 | Adamowicz et al. | 162/145 |
| 4,623,428 | A | * | 11/1986 | Bernheim et al. | 162/158 |
| 4,702,844 | A | * | 10/1987 | Flesher et al. | 210/733 |
| 4,753,710 | A | * | 6/1988 | Langley et al. | 162/164.3 |
| 4,824,523 | A | * | 4/1989 | Wagberg et al. | 162/164.1 |
| 4,911,788 | A | * | 3/1990 | Pittman et al. | 162/145 |
| 5,134,179 | A | * | 7/1992 | Felegi et al. | 524/13 |
| 5,338,406 | A | * | 8/1994 | Smith | 162/168.2 |
| 5,633,300 | A | * | 5/1997 | Dasgupta | 524/55 |
| 5,641,855 | A | * | 6/1997 | Scherr et al. | 528/310 |
| 6,235,835 | B1 | * | 5/2001 | Niessner et al. | 525/54.24 |

FOREIGN PATENT DOCUMENTS

| | | | |
|---|---|---|---|
| CA | 1110019 | * | 10/1981 |
| EP | 0 362 770 | A2 | 10/1989 |
| EP | 0362770 | * | 10/1989 |
| EP | 0723047 | * | 11/1996 |
| EP | 0 723 047 | A2 | 11/1996 |
| WO | WO 99/05361 | * | 2/1999 |
| WO | 99/05361 | A1 | 2/1999 |
| WO | WO 01/77437 | * | 10/2001 |
| WO | 01/77437 | A1 | 10/2001 |

* cited by examiner

*Primary Examiner*—Mark Halpern

(57) ABSTRACT

A method and composition are disclosed for providing a two-part polymer binder additive for a fibrous sheet for improving both its strength and durability. The two-part polymer binder may be added to augment organic binders to increase board strength and durability or to reduce the amount of organic binder required. The polymers may also be added in place of conventional organic binders or added in addition to organic binders to improve sag resistance and fibrous sheet performance.

26 Claims, 7 Drawing Sheets

Interpolyelectrolyte Complex (IPEC)
Dry Strength Enhancement
Polyacrylic acid example

Neutralized anionic $COO^-$ acid groups, .33:1 to protonated acid groups

Functional COOH acid groups, 3:1 to anionic groups

Cationic polymer, matched 1:1 to anionic groups

H Proton from acid group, creating neutralized anionic group.

IPEC plus Cross-linking and Binder
Wet and Dry Strength
Functional groups attach to binder at elevated temperature..

Polyelectrolyte Surfactant Complexes (PESCs)
Cationic Surfactant with Anionic polymer.
Wet and Dry Strength Synergistic Effect of IPEC and Starch on Dry Strength Synergistic Effect of PESC and Starch on Dry Strength Synergistic Effect of PESC and Starch on Wet Strength Synergistic Effect of Cross-linked (#)IPEC and Starch on Dry Strength

FIBROUS SHEET BINDERS

Matter enclosed in heavy brackets [ ] appears in the original patent but forms no part of this reissue specification; matter printed in italics indicates the additions made by reissue.

*This application is a Reissue of application Ser. No. 09/933,408 filed on Aug. 20, 2001, now U.S. Pat. No. 6,755,938.*

FIELD OF INVENTION

The present invention generally relates to fibrous sheets and more specifically to polymer additives for enhanced fibrous sheets.

BACKGROUND

Fibrous sheets are used for a variety of different purposes and are comprised of an array of different fibers, binders and fillers. For example, fibrous sheets can be used as acoustical ceiling tiles, paper products and furniture board. Primarily, fibrous sheets can be comprised of mineral wool, perlite, cellulosic fibers, fillers and binders.

Fibrous sheet production utilizes combinations of fibers, fillers, bulking agents, binders, water, surfactants and other additives mixed into a slurry and processed into a fibrous sheet. Examples of fibers used may include mineral fiber, fiberglass, and cellulosic material. Mineral wool is a lightweight, vitreous, silica-based material spun into a fibrous structure similar to fiberglass. Cellulosic material is typically in the form of newsprint. Added fillers may include expanded perlite, brighteners such as titanium oxide and clay. Expanded perlite reduces material density and clay enhances fire resistance. Examples of binders used in fibrous sheets include starch, latex and reconstituted paper products, which link together and create a binding system locking all ingredients into a structural matrix.

Organic binders, such as starch, are often the primary component providing structural adhesion for the fibrous sheet. Starch is often the preferred organic binder because it is relatively inexpensive. For example, fibrous sheets containing newsprint, mineral wool and perlite are often bound together by starch. Starch imparts both strength and durability to the fibrous sheet structure.

Unfortunately, there is a limit on how much starch can be added before such properties begin to decline. Starch is highly water-soluble and when partially hydrated loses a portion of its ability to bind the fibrous sheet components. Additionally, water-felted and cast panels tend to exhibit limited stability under high moisture loads given the hydrophilic nature of the cellulosic fibers. Furthermore, fibrous sheet strength and durability cannot simply be enhanced by using increased quantities of starch and cellulose, since starch increases a fibrous sheet's susceptibility to moisture and sag.

Thus, a high degree of starch and cellulose can lead to sagging and weakening of the board under humid conditions. Also, fibrous sheets having large quantities of starch require elevated drying rates or increased drying time to remove excess water from the board. Therefore, there a need for a method for increasing both the strength and durability of a fibrous sheet without the addition of increased quantities of starch. Additionally, there is a need for a fibrous sheet that is not susceptible to sagging under high moisture loads and does not require increased drying times during processing.

SUMMARY

The present invention encompasses both a method and composition for providing a two-part polymer binder additive for a fibrous sheet for improving both its strength and durability. The two-part polymer binder may be added to augment current organic binders to increase such desirable board properties as strength and durability or the polymers may be added to reduce the amount of organic binder required. Additionally, the polymers may be added in place of conventional organic binders or added in addition to organic binders to improve sag resistance and fibrous sheet performance.

The two-part polymer binder comprises both the addition of an anionic polymer having a negative charge of between about 4 to about 12 milliequivalents per gram and a cationic polymer having a positive charge of between about 6 to about 12 milliequivalents per gram. The two-part polymer binder forms an interpolyelectrolyte complex.

In greater detail, the two oppositely charged polymers act together to provide a synergistic effect that when added in addition with an organic binder, the strength and performance of the fibrous sheet is enhanced. The two oppositely charged polymers can coat and bond the organic binder to the fibers of the fibrous sheet to impart strength to the board.

Additionally, a surfactant may be added to the polymer binder. In a further embodiment a hydrogel and/or a latex may also be added. Combinations of all the described embodiments may also be used for the polymer binder.

The method of forming an enhanced fibrous sheet includes the steps of forming a fibrous slurry and mixing into the fibrous slurry an anionic polymer having a negative charge of between about 4 to about 12 milliequivalents per gram and then mixing a cationic polymer having a positive charge of between about 6 to about 12 milliequivalents per gram. The fibrous sheet is then dried to form the finished product.

Additionally, a fibrous sheet is provided comprising at least one type of fiber and an organic binder. The fibrous sheet also contains an anionic polymer having a negative charge of between about 4 to about 12 milliequivalents per gram and a cationic polymer having a positive charge of between about 6 to about 12 milliequivalents per gram.

DETAILED DESCRIPTION

Figure 1:
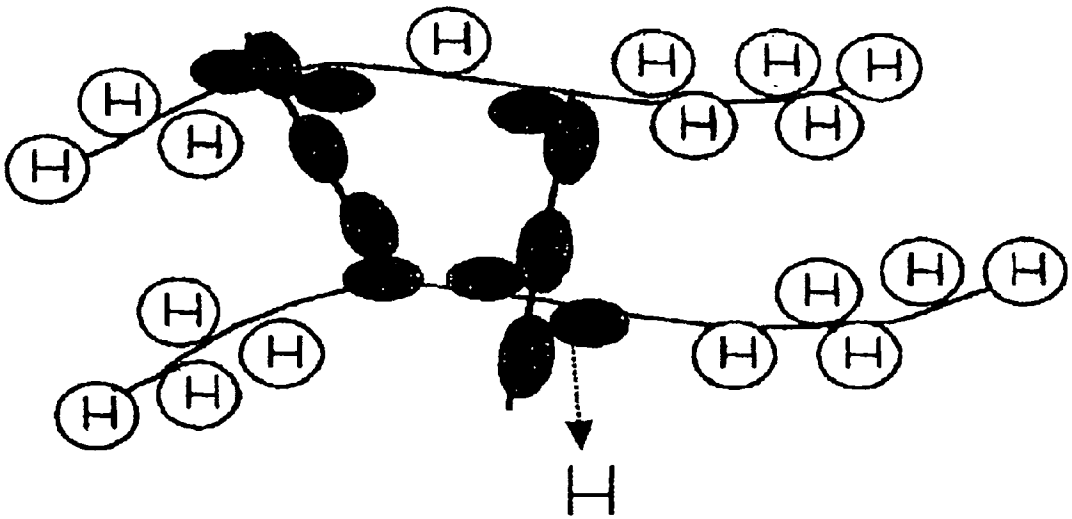
FIG. 1 is a schematic presentation of the interpolyelectrolyte complex.
Figure 2:
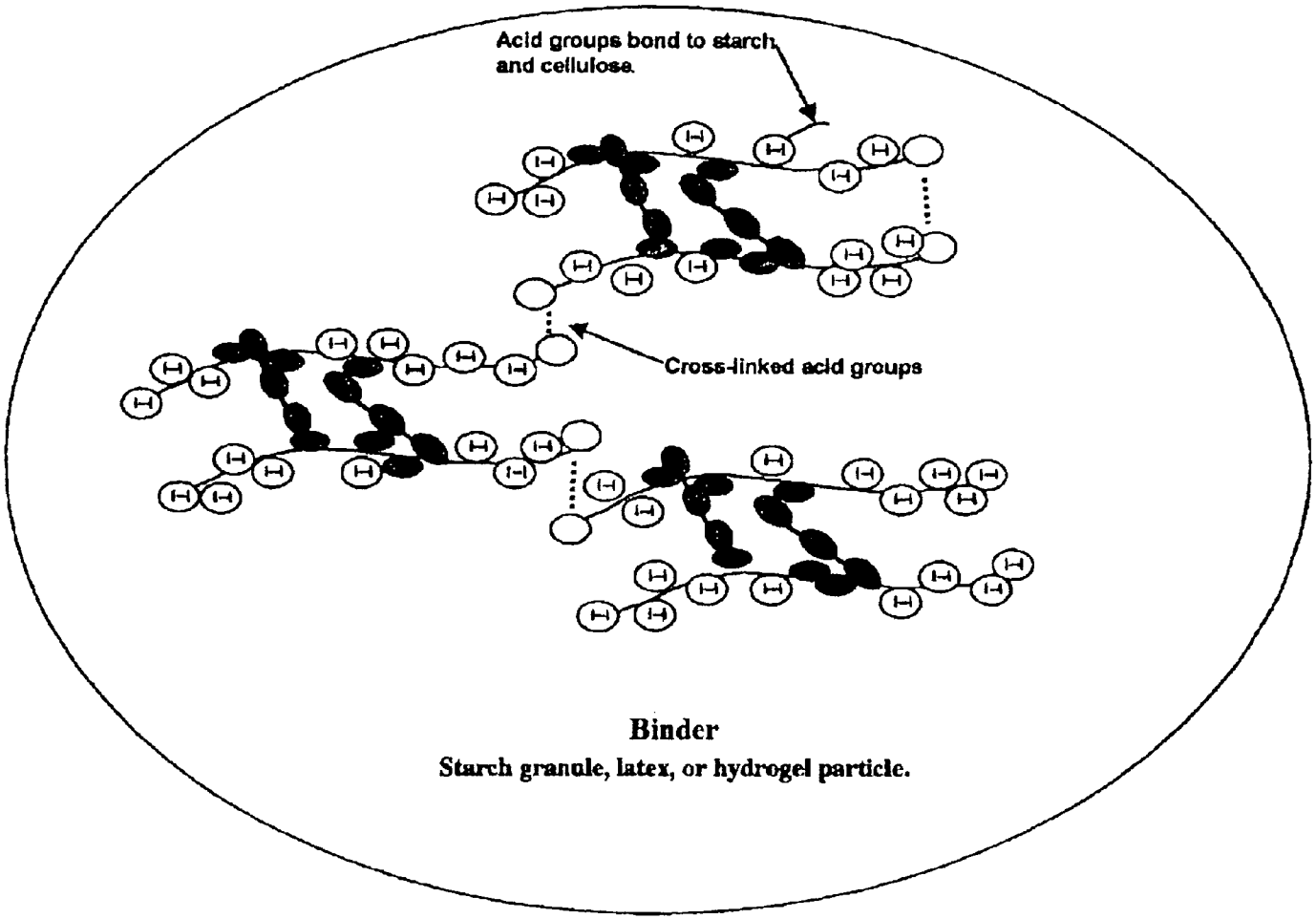
FIG. 2 is a schematic presentation of the interpolyelectrolyte complex having cross-linking and formed around a spacer such as a polysaccharide, hydrogel, and latex.
Figure 3:
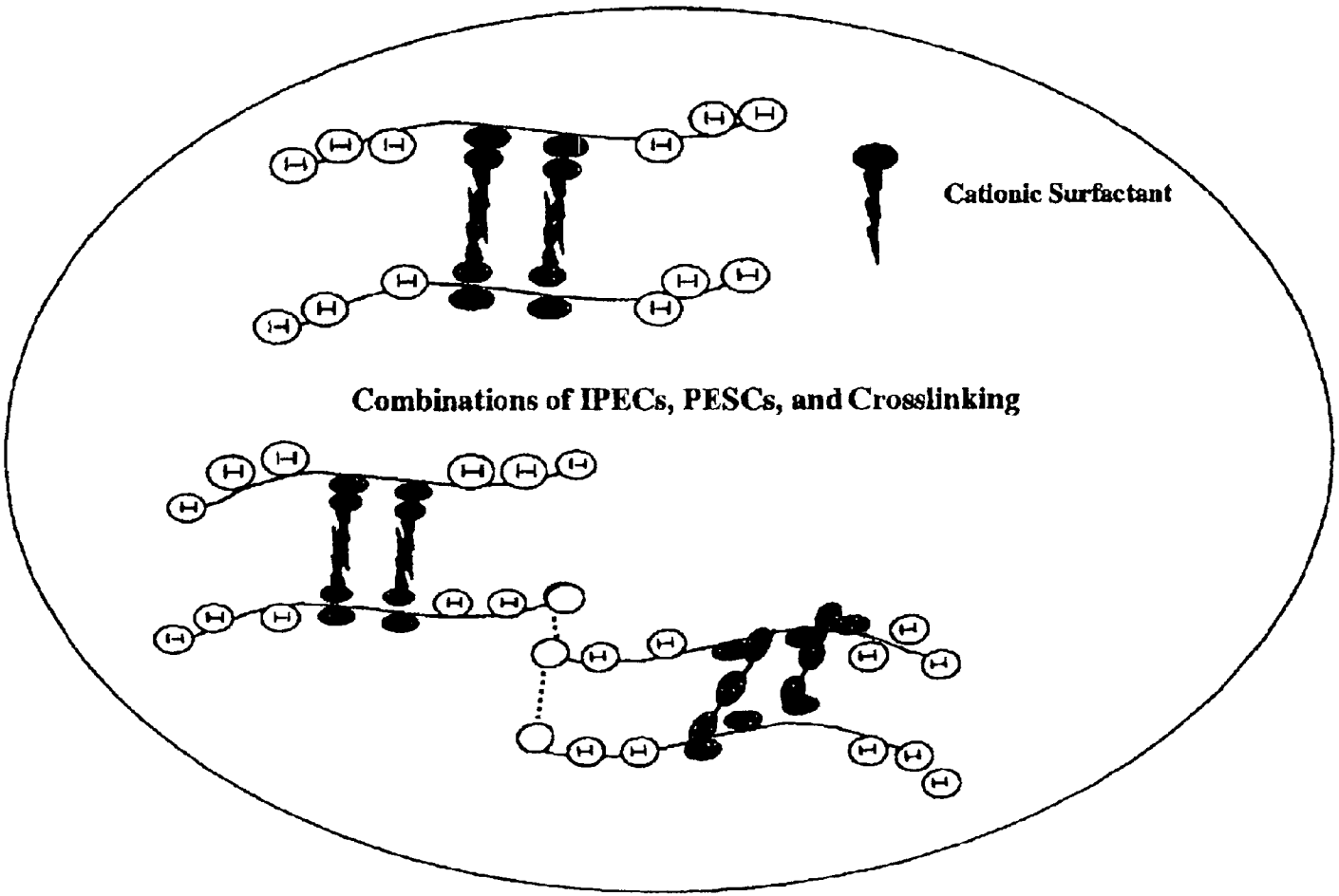
FIG. 3 is a schematic presentation of the interpolyelectrolyte complex combined with a surfactant.

The present invention includes both a method and composition for a two-part polymer binder additive used in fibrous sheet formation for improving both sheet strength and durability. The two-part polymer binder additive comprises a polyanion and polycation to form an interpolyelectrolyte complex (IPEC). The formed IPEC results from various ratios of polyanion to polycation. The polyanion typically consists of a charged portion and a reactive portion. The polycation is usually 100% charged and is added such that its charged portion approximately matches the charged portion of the polyanion. The polyanion is typically added to the board components before the polycation since most board components are anionic.

The two oppositely charged polymers act together to provide a synergistic effect that when added with an organic binder, the strength and performance of the fibrous sheet is enhanced. The two oppositely charged polymers can coat and bond the organic binder to the fibers of the fibrous sheet to impart strength to the sheet. The organic binder typically used in the formation of fibrous sheets is a polysaccharide. Starch is a commonly used binder due to its economics of use. Additionally, other binders, fillers or spacers may also be used either alone or in combination with each other. For example, a hydrogel or a latex may be used.

In greater detail, the polyanion is ionic and typically has a negative charge between about 4 and 12 milliequivalents per gram. Its molecular size may be between about 10,000 and 900,000 grams/mole. Depending on the specific molecule, this represents a degree of polymerization of about 100 to 13000 repeat units per polymer molecule. Additionally, the polyanion may be crosslinked to provide further strength. Typically the cross-link density is about 1 per 100 units, however, from zero cross-linking to about 1 per 50 units is effective.

The polycation is also ionic and may have a positive charge from about 6 to 12 milliequivalents per gram. Similarly, its size is also between about 10,000 and 900,000 grams per mole, representing a degree of polymerization of about 50 to 10,000 depending on the particular molecule.

In weakly acidic polyanions, this may be achieved by partially neutralizing a weak polyacid such as polyacrylic acid or by adding the salt of the acid, such as sodium polyacrylate. For this molecule, the neutralized portion is negatively charged and the unneutralized acid portion can react with starch and paper at the drying temperatures given above. Thus, the charge ratio of polyanion to polycation is typically in the ratio of 1:1.

For subsequent reactions, normally there exist excess functional groups, groups not involved in the complex formation, to be able to react with some of the board components to form hydrogen or more preferable covalent bonds. Therefore, there is an additional ratio requirement to forming an effective IPEC binder. The ratio of total polyanion acid groups, both neutralized and unneutralized, to total polycation groups is considered. This ratio should typically be between 10:1 and 1.1:1, and is effective at 3:1.

The polyanion may be selected from the group of polyanions set forth in Table 1 below. The group of listed polyanions is not intended to be exclusive and other polyanions meeting the above described criteria may also be used. For example, block and graft copolymers of the listed polymers having nonionic polymers which are either soluble or water insoluble, but form stable aqueous dispersions, may also be used as one component of the IPEC.

TABLE 1

| Polyanions | | | |
|---|---|---|---|
| Polycarboxylates | Polyphosphates | Polysulfonates | Polysulfates |
| Poly (acrylic acid) and its salts (PAA) | Polymetaphosphoric acid and its salts. | Polystyrenesulfonic acid and its salts. | Polyvinylsulfate acid and its salts. |
| Poly (methacrylic acid) and its salts. | Polyvinylphosphonic acid and its salts. | Lignosulfonic acid and its salts. | Chondroitinsulfate acid and its salts. |
| Carboxymethylcellulose and its salts | | Polyacrylamidalkylpropanesulfonic acid and its salts. | |
| Polymaleic acid and its salts | | Random copolymers of acrylamidalkylopropanesulfonic acid with acrylamide and other hydrophilic and hydrophobic comonomers and their salts. | |
| Random copolymers of acrylic and/or methyacrylic acid with acrylamide and other hydrophilic monomers including those with functional groups reactive with cellulose and/or starch and hydrophobic comonomers and their salts. Hydrolyzed copolymers of maleic anhydride with styrene and other hydrophilic and hydrophobic comonomers and their salts. | | | |

The polycation may be selected from the group of polyanions set forth in Table 2 below. The group of listed polyanions is not intended to be exclusive and other polyanions meeting the above described criteria may also be used. For example, block and graft copolymers of the listed polymers having nonionic polymers which are either soluble or water insoluble, but form stable aqueous dispersions, may also be used as one component of the IPEC.

TABLE 2

| Polycations | | | | |
|---|---|---|---|---|
| Polymeric Primary amines | Polymeric secondary amines | Polymeric tertiary amines | Polymeric Quaternary amines | Polymeric amines with different amino groups |
| Polyvinylamine and its salts | Linear polethyleneimine and its salts. | Poly-N,N-dimethylaminoethylmethacrylate (PDMAEM) and its | Poly-N,N-diallyl-N,N-dimethylammonium hydroxide | Branched polyethyleneimine and its salts. |

TABLE 2-continued

| Polycations | | | | |
|---|---|---|---|---|
| Polymeric Primary amines | Polymeric secondary amines | Polymeric tertiary amines | Polymeric Quaternary amines | Polymeric amines with different amino groups |
| | | salts. | (PDADMAH) and its salts. | |
| Chitosane and its salts. | Linear polypropylene-imine and its salts. | Poly-4-vinylpyridine and its salts. | Ioenenes hydroxides and their salts. | Partially quarternized poly-4-vinylgyridine and its salts. |
| | | Copolymers of DMAEM with acrylamide and other hydrophilic and hydrophobic comonomers and their salts. | Poly-N-alkyl-4-vinlypyridinium salts. | |

The polyanion may be added first with the board components, then the polycation may be added. This may be due to the improved distribution of the resulting IPEC among the board components when the polyanion is added first. Generally, the idea is to add whichever component of the IPEC that is not reactive first. The second component then reacts and locks the IPEC into place evenly among the components. Therefore, since the components used in this example are anionic, one would add the polyanion first. If, however, the components were cationic, then the polycation would be added first. The two-part polymer binder may be added to augment current organic binders to increase such desirable board properties as strength and durability, or the polymers may be added to reduce the amount of organic binder required. Additionally, the polymers may be added in place of conventional organic binders, or added in addition to organic binders to improve sag resistance and fibrous sheet performance.

Additionally, a surfactant may be added to the polymer binder. The addition of a surfactant creates a polyelectrolyte-surfactant complex (PESC). PESCs are the products of interaction of oppositely charged polyelectrolytes and surfactants. The formation of PESC involves most any pairs of polyanions and cationic surfactants as well as pairs of polycations and anionic surfactants, which form upon mixing an aqueous solution of insoluble products.

The surfactants may be anionic or cationic. Anionic surfactants include alkycarboxylic acids and their salts, alkysulfonic acids and their salts, alkylsulfates, alkylphosphoric acids and their salts, and combinations thereof. Cationic surfactants can include alkylamines, fatty amines' including primary, secondary, tertiary, quarternary amines. This list is not inclusive and other substitutes having similar characteristics are contemplated.

The method of forming an enhanced fibrous sheet includes the steps of forming a fibrous slurry and mixing into the fibrous slurry an anionic polymer having a negative charge of between about 4 to about 12 milliequivalents per gram and a cationic polymer having a positive charge of between about 6 to about 12 milliequivalents per gram. The fibrous sheet is then dried to form the finished product.

In greater detail, the process for creating the enhanced fibrous sheet includes forming a fibrous slurry comprised of cellulose and water. Typically, the cellulose is derived from paper, usually in the form of newsprint, which is then pulped in water at a consistency of about 3 to 5% by weight. Of course the consistency may vary depending upon the desired board characteristics. Additionally, other fibers, such as mineral wool, may be added to the slurry. In addition to the fibers, fillers may be added. Example fillers include perlite and clays that can be combined with the paper and water. The total consistency typically is about 3% by weight. Other consistencies ranging from as high as 50% to as low as 1% are also contemplated depending upon the type of board and manufacturing process.

An organic binder such as starch may also be included into the slurry. The board may be formed without the addition of an organic binder, but the combination of starch and IPEC polymers has been found to create a synergistic effect of enhanced properties. Starch is the most typical binder given that the organic binder is relatively inexpensive when compared to other binders having similar characteristics. Of course, other binders may be used instead of, or in combination with, starch. For example, latex may be used in combination with the starch binder or as a substitution.

The IPEC is typically added to the above slurry after the organic binder has been mixed into the cellulose slurry. This combination is then mixed. The polyanion is preferably mixed in first, since it will not interact strongly with the other components of the mix because they are also anionically charged. Of course, if the components of the mix were cationically charged, this would not be the case. The addition of the polyanionic portion of the IPEC first aids in distributing polyanion evenly among the components. It is contemplated that the IPEC components may be added simultaneously, in reserve order or premixed, so long as the IPEC is formed in the fibrous mix.

The polycationic portion of the IPEC may then be added after the addition of the polyanionic portion. The IPEC reaction may then occur, causing polyanionic and polycationic polymers to form a complex and become entangled and absorbed onto the board components, especially the starch and cellulosic fibers.

The resulting slurry may then be formed into boards using typical board and papermaking techniques. For example, a high molecular weight flocculant polymer may be added to aid in drainage to speed up the drying process. The slurry is typically pumped onto a fourdrinier machine, the water drained by gravity, then by vacuum, and finally the structure is pressed to a constant thickness.

The formed sheet may then be dried and cut. Drying may occur in ovens. The final product is typically sanded and decorated by surface treatment and painting.

The invention will be more easily understood by referring to the examples of the invention and the control samples that follow. The following examples are given for illustrative purpose and are not to be understood as limiting the present invention.

IPEC EXAMPLES

Example 1

4.5 g of mineral wool were dispersed in 400 ml warm (T=40° C.) 0.001N KCl aqueous solution under stirring by a mechanical stirrer. Then 1.8 g of corn starch and 17.1 g of perlite were added. Newsprint (6.6 g) was kept in 200 ml warm (T=40° C.) water for 1 hour, ground by blender and mixed with the other components of composition under stirring. The total volume of mixture was made to 1000 ml.

Interpolyelectrolyte complex (IPEC) based on partially neutralized poly(acrylic acid) (PAA) with poly(N,N-dimethyl-N,N-diallylammonium chloride) (PDADMAC) was used as a starch modifier. To make this complex, 3.6 ml 0. IN aqueous solution of sodium poly(acrylate) (NaPA) (0.034 g of NaPA) and 7.2 ml 0.1N aqueous solution of PAA (0.052 g of PAA) were added to the mixture under stirring. After that, 3.6 ml 0.1N aqueous solution of poly(N,N-dimethyl-N,N-diallylammonium chloride) (PDADMAC) (0.058 g of PDADMAC) was added under stirring for about 2 minutes. Thus, 0.145 g of IPEC(PAA-PDADMAC), Φ=[carboxylic groups]/[amine groups]=3.0 was added to the composition as a modifier. Flocculant (0.0188) in the form of 0.2 wt. % aqueous dispersion was added by plastic syringe.

The obtained mixture was filtered with a Buchner funnel using 2 layers of paper filler and dried in the "starch-brewing" regime. To create the brewed starch regime, the sample was enveloped in aluminum foil and kept at 177° C. for 1 hour. After that it was unwrapped and dried again at 177° C. for 1 hour.

The compositions were tested in dry and wet states by bending using Instron 1195(UK) or UTS-10 (Germany) dynamometers. The samples were cut into strips 10 mm by 80–120 mm. The thickness of each strip was estimated using an optimeter. The wet composition samples were prepared via equilibration with water vapor at 95% relative humidity (95RH) (saturated solution of $KNO_3$ in distilled water at 20° C.) in a dessicator for 14 days. All the mechanical tests were carried out just after taking the samples out of the dessicator. The rate of deformation was 5 mm/min. The values of stress at break, σ* (N/mm2 or MPa) were estimated from stress-strain curves. The results of mechanical testing were:

σ*=0.45 MPa, dry state

σ*=0.15 MPa, wet state (σ*-value for composition not containing IPEC, prepared in the "starch-brewing" regime σ*=0.35 MPa, dry state σ*=0.10 MPa, wet state).

Example 2

The IPEC modified composition was prepared as for Example 1, except that 0.3 g IPEC(PAA-PDADMAC), Φ was added as a modifier. 7.2 ml 0.1N aqueous solution of sodium poly(acrylate) (NaPA) (0.07 g of NaPA), 14.4 ml 0.1N aqueous solution of PAA (00.10 g of PAA) and 7.2 ml 0.1N aqueous solution of poly(N,N-dimethyl-N,N-diallylammonium chloride) (PDADMAC) (0.12 g of PDADMAC) were added to the composition under stirring. 0.018 g of flocculant in the form of 0.2 wt. % aqueous dispersion was added last.

The results of mechanical testing:

σ=0.50 MPa, dry state

σ=0.20 MPa, wet state.

Example 3

The IPEC modified composition was prepared as for Example 1, except that the 0.9 g of starch was added instead of 1.8 g.

The results of mechanical testing:

σ*=0.38 MPa, dry state

σ*=0.10 MPa, wet state (σ*—value for composition including 0.9 g of starch and not containing IPEC σ*=0.20 MPa, dry state σ*=0.05 MPa, wet state).

Example 4

The IPEC modified composition was prepared as for Example 2, except that the composition included 0.9 g of starch instead of 1.8 g.

The results of mechanical testing:

σ*=0.50 MPa, dry state

σ*=0.25 MPa, wet state.

Example 5

The IPEC modified composition was prepared as for Example 1, except that the composition included 0.9 g of starch and 0.48 g IPEC(PAA-PDADMAC), Φ as a modifier. 12 ml 0.1N aqueous solution of sodium poly(acrylate) (NaPA) (0.11 g of NaPA), 24 ml 0.1N aqueous solution of PAA (0.173 g of PAA) and 12 ml 0.1N aqueous solution of poly(N,N-dimethyl-N,N-diallylammonium chloride) (PDADMAC) (0.194 g of PDADMAC) were added under stirring. 0.018 g of flocculent in the form of 0.2 wt. % aqueous dispersion was added last.

The results of mechanical testing:

σ*=0.60 MPa, dry state

σ*=0.30 MPa, wet state.

Example 6

The IPEC modified composition was prepared as for Example 1, except that the composition did not contain starch and 1.8 g IPEC(PAA-PDADMAC), Φ was added as a modifier. 44.0 ml. 0.1N aqueous solution of sodium poly (acrylate) (NaPA) (0.42 g of NaPA), 88.0 ml 0.1N aqueous solution of PAA (0.63 g of PAA) and 44.0 ml 0.1N aqueous solution of poly(N,N-dimethyl-N,N-diallylammonium chloride) (PDADMAC) (0.7 g of PDADMAC) were added to the composition under stirring. 0.018 g of flocculant in the form of 0.2 wt. % aqueous dispersion was added last.

The results of mechanical testing:

σ*=0.70 MPa, dry state

σ*=0.40 MPa, wet state.

Figure 4:
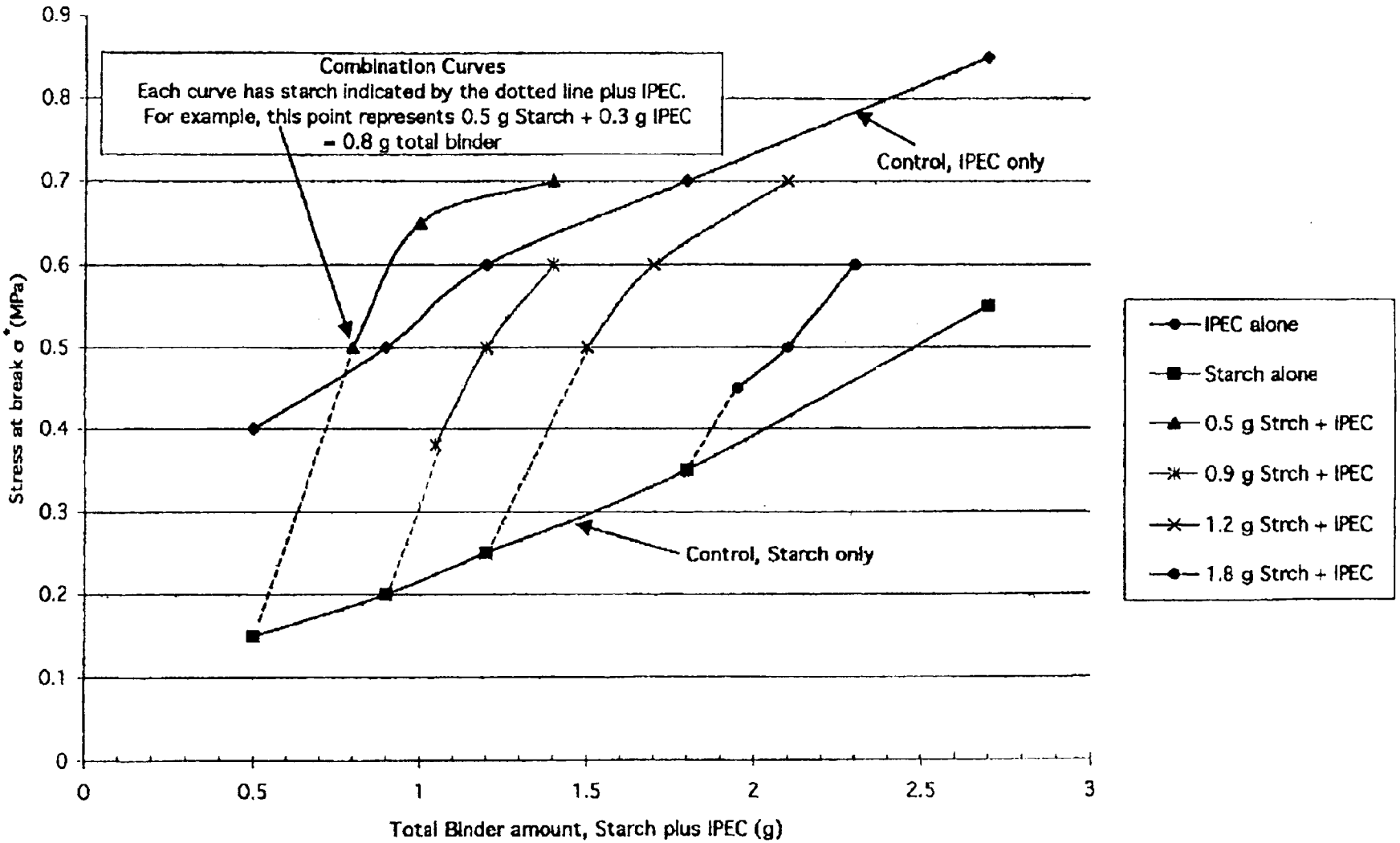
FIG. 4 is a graphical representation of the binding strength of starch binder and various IPEC combinations having a synergistic effect as shown between IPEC and starch.

The results of mechanical testing of the compositions in terms of the values of stress at break (MPa) are listed in Table 3 and FIG. 4. FIG. 4 and Table 3 illustrate the effects of starch and IPEC modifier compared to starch alone and IPEC alone, on the mechanical characteristics of the composition prepared in the "brewing regime."

TABLE 3

IPEC Data

| | Starch (g) | IPEC (g) | Total binder (g) | Stress at break σ* dry (Mpa) | Stress at break σ* wet (Mpa) |
|---|---|---|---|---|---|
| Control 1 | 0 | 0.5 | 0.5 | 0.4 | 0.3 |
| IPEC alone | 0 | 0.9 | 0.9 | 0.5 | 0.35 |
| | 0 | 1.2 | 1.2 | 0.6 | 0.4 |
| | 0 | 1.8 | 1.8 | 0.7 | 0.4 |
| | 0 | 2.7 | 2.7 | 0.85 | 0.45 |
| Control 2 | 0.5 | 0 | 0.5 | 0.15 | 0.1 |
| Starch alone | 0.9 | 0 | 0.9 | 0.2 | 0.05 |
| | 1.2 | 0 | 1.2 | 0.25 | 0.07 |
| | 1.8 | 0 | 1.8 | 0.35 | 0.1 |
| | 2.7 | 0 | 2.7 | 0.55 | 0.25 |
| Combination | 0.5 | 0.3 | 0.8 | 0.5 | 3 |
| 0.5 g Starch | 0.5 | 0.5 | 1 | 0.65 | 0.4 |
| plus varied IPEC | 0.5 | 0.9 | 1.4 | 0.7 | 0.4 |
| Combination | 0.9 | 0.15 | 1.05 | 0.38 | 0.1 |
| 0.9 g Starch | 0.9 | 0.3 | 1.2 | 0.5 | 0.25 |
| plus varied IPEC | 0.9 | 0.5 | 1.4 | 0.6 | 0.3 |
| Combination | 1.2 | 0.3 | 1.5 | 0.5 | 0.25 |
| 1.2 g Starch | 1.2 | 0.5 | 1.7 | 0.6 | 0.3 |
| plus varied IPEC | 1.2 | 0.9 | 2.1 | 0.7 | 0.35 |
| Combination | 1.8 | 0.15 | 1.95 | 0.45 | 0.15 |
| 1.8 g Starch | 1.8 | 0.3 | 2.1 | 0.5 | 0.2 |
| plus varied IPEC | 1.8 | 0.5 | 2.3 | 0.6 | 0.25 |

PESC (SURFACTANT) EXAMPLES

In the following examples, polyelectrolyte-surfactant complexes (PESC) additives where added to a basic mix of fiberboard components. The mechanical characteristics of the compositions containing different amounts of starch and PESC additives are illustrated in the examples. The basic components for the fiberboard were prepared in the brewing regime and were added in the following amounts:

| | |
|---|---|
| Newsprint | 6.6 g |
| Mineral Wool | 4.5 g |
| Perlite | 17.1 g |
| Starch | 0-2.7 g |
| Flocculant | 0.018 g |
| 0.001N KCl aqueous solution | 1000 g |

Example 7

Mineral wool, starch, perlite and newspaper were mixed as described in Example 1. Polyelectrolyte-surfactant complex (PESC) formed by partially neutralized poly(acrylic acid) (PAA) and dodecyltrimethylammonium bromide (DDTMAD) was used as a modifier 3.6 ml 0.1N aqueous solution of sodium poly(acrylate) (NaPA) (0.034 g of NaPA) and 7.2 ml 0.1N aqueous solution of PAA (0.052 g of PAA) were added under stirring. 9.0 ml 0.04N aqueous solution of DDTMAB (0.11 g) was added and stirred for 2 minutes. Thus, 0.2 g of PESC(PAA-DDTMAB), Φ=[carboxylic groups]/[amine groups]=3.0 was added to the composition as a modifier. 0.018 g of flocculant in the form of 0.2 wt. % aqueous dispersion was added last by a plastic syringe.

The mixture was filtered with a Buchner funnel and dried in the "starch-brewing" regime as described in Example 1.

The results of mechanical testing:

σ*=0.50 MPa, dry state

σ*=0.30 MPa, wet state.

Example 8

The PESC modified composition was prepared as described in Example 7, except that DDTMAB was added first.

The results of mechanical testing:

σ*=0.47 MPa, dry state

σ*=0.29 MPa, wet state.

Example 9

The PESC modified composition was prepared as described in Example 7, except that 0.144 g of PESC(PAA-DDTMAB), Φ=[carboxylic groups]/[amine groups]=1.0, was added as a modifier. 3.6 ml 0.1N aqueous solution of sodium poly(acrylate) (NaPA) (0.034 g of NaPA) and after that 9.0 ml 0.04N aqueous solution of DDTMAB (0.11 g) was added under stirring.

The results of mechanical testing:

σ*=0.50 MPa, dry state

σ*=0.30 MPa, wet state.

Example 10

In this example the PESC was added without the addition of starch. The stoichiometric complex formed by sodium polyacrylate (NaPA) and dodecyltrimethylammonium bromide (DDTMAB) named as PESC, ϕ=1, as well as the non-stoichiometric PESC, ϕ=3.0 containing a threefold excess of poly(acrylic acid), were used.

Newsprint, mineral wool and perlite were mixed in 1000 ml of warm (40° C.) 0.001 N KCl aqueous solution under stirring. Then, 0.1 N NaPA aqueous solution and the corresponding amount of 0.04 N aqueous solution of DDTMAB were added under stirring for about 2–3 minutes. In the case of PESC, ϕ=1 the equimolar amounts of NaPA and DDTMAB were added. In the case of PESC, ϕ=3.0, the predetermined amount of 0.1 N aqueous solution of partially (one third) neutralized poly(acrylic acid), and corresponding amount of DDTMAB were consequently added under stirring for about 2–3 minutes. The flocculant in the form of 0.2 wt. % aqueous solution was added last by means of quick injecting it by plastic syringe.

The obtained mixtures were filtered with a Buchner funnel. The samples were enveloped in aluminum foil and kept at 177° C. for 1 hour and unwrapped and dried at 177° C. for 1 hour.

The wet compositions were prepared via equilibration with water vapor at 95% relative humidity (95 RH) saturated solution of $KNO_3$ in distilled water at 20° C.) in the dessicator for 14 days. The samples were taken out the dessicator and were cut into 5–6 strips in the form of parallelepipeds with the length 100 mm, the width 10 mm and the thickness 8–10 mm. These strips were kept at 95 RH for 24 hours. All the mechanical tests were carried out just after taking the strips out the dessicator using UTS-10 dynamometer (Germany) with the gauge length 70 mm.

The results of mechanical testing of the compositions in terms of the values of stress—at break, σ* (MPa) are listed in the Table 4, control 1 and control 2 sections. Table 4 illustrates the effects of PESC (PAA-DDTMAB) ϕ=1, ϕ=3.0 ϕ=[PAA]/[DDTMAB]) as binders on the mechanical characteristics of the composition prepared in the "brewing regime." All samples contain 6.6 g of newsprint, 4.5 g of mineral wool, 17.1 g of perlite and 0.018 g of flocculent. The samples did not contain starch. The samples were tested in dry and wet state.

The strengthening effect of PESC, ϕ=1 and PESC, ϕ3.0 used as co-binders together with the starch was also tested. The procedure of the preparation of the composition was the same as described above; however, the only difference is the variable amount of the starch. The samples for mechanical testing were prepared in the "starch brewing" regimes and were tested in the dry as well as in the wet state.

Figure 5:
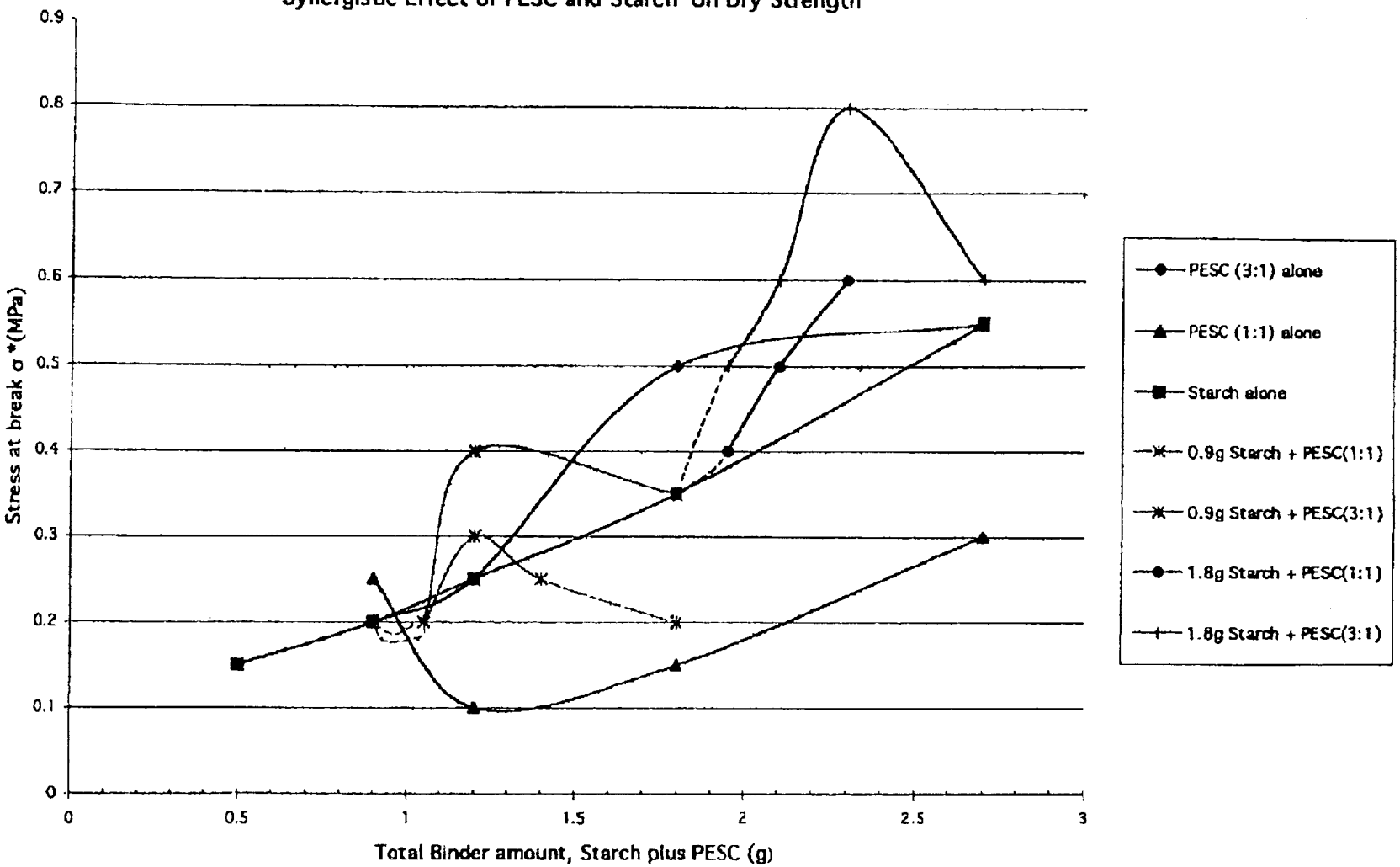
FIG. 5 is a graphical representation of the binding strength of starch binder and various cross-linked IPEC combinations with a synergistic effect.
Figure 6:
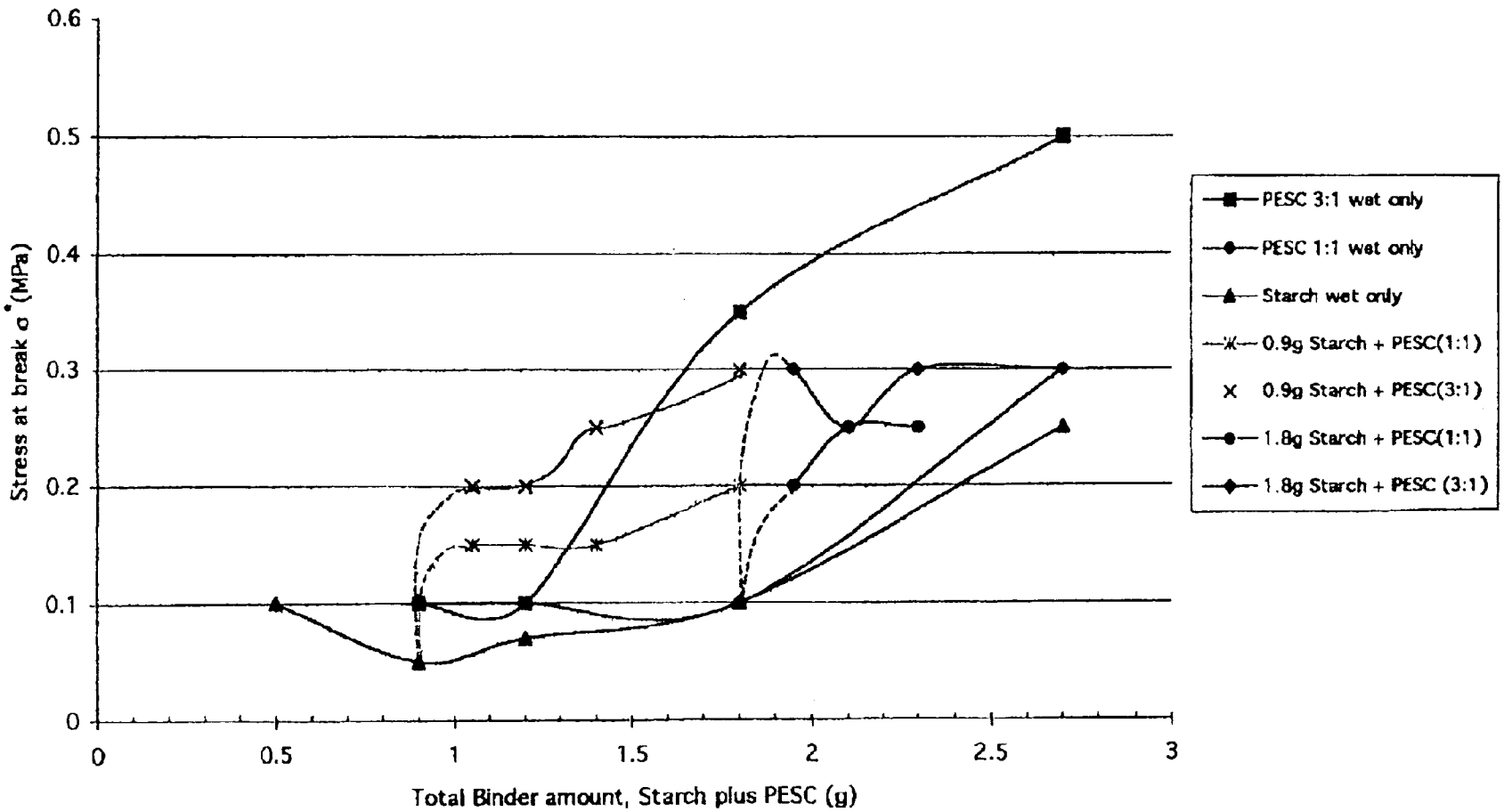
FIG. 6 is a graphical representation of the binding strength of starch binder and various polyelectrolyte-surfactant complexes (PESCs)

The results of mechanical testing of compositions containing the starch binder and PESC, ϕ=1 or PESC, ϕ=3.0 co-binders are listed in Table 4 under combinations. Table 4 and FIGS. 5 and 6 illustrate the joint action of starch binder and PESC (PAA-DDTMAB) ϕ=1, ϕ=3.0 co-binder on the mechanical characteristics of the compositions prepared in the brewing regime. All samples contained 6.6 g of newsprint, 4.5 g of mineral wool, 17.1 g of perlite and 0.018 g of flocculant. The samples were tested in dry and wet state.

TABLE 4

Polyelectrolyte-Surfactant Complexes (PESC) Data

| | Starch (g) | PESC (g) | Total binder (g) | Stress at break σ* dry (Mpa) | Stress at break σ* wet (Mpa) |
|---|---|---|---|---|---|
| Control 1 | 0 | 0.9 | 0.9 | 0.25 | 0.1 |
| PESC (1:1) | 0 | 1.2 | 1.2 | 0.1 | 0.1 |
| alone | 0 | 1.8 | 1.8 | 0.15 | 0.1 |
| | 0 | 2.7 | 2.7 | 0.3 | 0.3 |
| Control 2 | 0 | 0.9 | 0.9 | 0.2 | 0.1 |
| PESC (3:1) | 0 | 1.2 | 1.2 | 0.25 | 0.1 |
| alone | 0 | 1.8 | 1.8 | 0.5 | 0.35 |
| | 0 | 2.7 | 2.7 | 0.55 | 0.5 |
| Control 3 | 0.5 | 0 | 0.5 | 0.15 | 0.1 |
| Starch alone | 0.9 | 0 | 0.9 | 0.2 | 0.05 |
| (same data as | 1.2 | 0 | 1.2 | 0.25 | 0.07 |
| in Table 3) | 1.8 | 0 | 1.8 | 0.35 | 0.1 |
| | 2.7 | 0 | 2.7 | 0.55 | 0.25 |
| Combination | 0.9 | 0.15 | 1.05 | 0.2 | 0.15 |
| 0.9 g Starch | 0.9 | 0.3 | 1.2 | 0.3 | 0.15 |
| plus varied | 0.9 | 0.5 | 1.4 | 0.25 | 0.15 |
| PESC (1:1) | 0.9 | 0.9 | 1.8 | 0.2 | 0.2 |
| Combination | 0.9 | 0.15 | 1.05 | 0.2 | 0.2 |
| 0.9 g Starch | 0.9 | 0.3 | 1.2 | 0.4 | 0.2 |
| plus varied | 0.9 | 0.9 | 1.8 | 0.35 | 0.3 |
| PESC (3:1) | 0.9 | 0.5 | 1.4 | | 0.25 |
| Combination | 1.8 | 0.15 | 1.95 | 0.4 | 0.2 |
| 1.8 g Starch | 1.8 | 0.3 | 2.1 | 0.5 | 0.25 |
| plus varied | 1.8 | 0.5 | 2.3 | 0.6 | 0.25 |
| PESC (1:1) | | | | | |
| Combination | 1.8 | 0.15 | 1.95 | 0.5 | 0.3 |
| 1.8 g Starch | 1.8 | 0.3 | 2.1 | 0.6 | 0.25 |
| plus varied | 1.8 | 0.5 | 2.3 | 0.8 | 0.3 |
| PESC (3:1) | 1.8 | 0.9 | 2.7 | 0.6 | 0.3 |

The strengthening effect of mixed IPEC+PESC co-binder in "starch brewing" regime was also tested. Nonstoichiometric mixed IPEC (PAA-PDADMAC)+PESC (PAA-DDTMAB), ϕ=3.0 was used. It was prepared as follows:

The predetermined amount of 0.1 N aqueous solution of partially neutralized (α+0.33) poly(acrylic acid) and then corresponding amount of 0.04 N aqueous solution of the equimolar mixture of PDADMAC and DDTMAB were added under for about 2–3 minutes.

The compositions containing 0.9 g of the starch binder and different additives of mixed (IPEC+PESC), ϕ=3.0 co-binder were tested mechanically in the dry and wet state. The results of the latest measurements are listed in Table 3. Table 3 illustrates the joint action of starch binder and mixed IPEC (PAA-PDADMAC)+PESC (PAA-DDTMAB), ϕ=3.0 (ϕ=[PAA]/[DDTMAB+PDADMAC] at [DDTMAB]=[PDADMAC]) co-binder on the mechanical characteristics of the compositions prepared in the "brewing" regime. All samples contained 6.6 g of newsprint, 4.5 g of mineral wool, 17.1 g of perlite and 0.018 g of flocculant. The samples were tested in dry and wet state.

TABLE 5

IPEC and PESC Combinations as Starch Modifiers

| No. | Amount of starch, g | Amount of IPEC + PESC, ϕ = 3.0 | Sample state | σ*, MPa |
|---|---|---|---|---|
| 1 | 0.9 | 0 | dry | 0.2 |
| | | | wet | 0.1 |
| 2 | 0.9 | 0.15 | dry | 0.3 (0.5) |
| | | | wet | 0.2 |
| 3 | 0.9 | 0.3 | dry | 0.35 (0.6) |
| | | | wet | 0.2 |
| 4 | 0.9 | 0.5 | dry | 0.4 (0.7) |
| | | | wet | 0.2 |
| 5 | 0.9 | 0.9 | dry | 0.4 |
| | | | wet | 0.2 |

Cross-Linked Interpolyelectrolyte Complexes (#IPEC)

In the following examples, the effect of slightly crosslinked polyelectrolyte and linear polyelectrolyte on the mechanical characteristics of the compositions is illustrated. We used the commercial microgel of slightly cross-linked highly water swollen technical poly(acrylic acid) "Carbopol" 2001. The procedure of preparation of gel sample was the following: The predetermined amount of the dry "Carbopol" was swollen in 300 ml of tap water for five minutes. Then the calculated amount of 0.1N aqueous NaOH was added to neutralize the —COOH groups of "Carbopol" up to the degree of neutralization α=0.33 (the amount of NaOH added was equal to 33% relative to the —COOH groups of "Carbopol." The partially neutralized "Carbopol" was additionally swollen in water for 12 hours. The equilibrium degree of swelling, defined as the ratio of the mass of swollen gel to that of the dry gel equaled 1000. The size of the equilibrium swollen microgel particles was about 1 mm.

Figure 7:
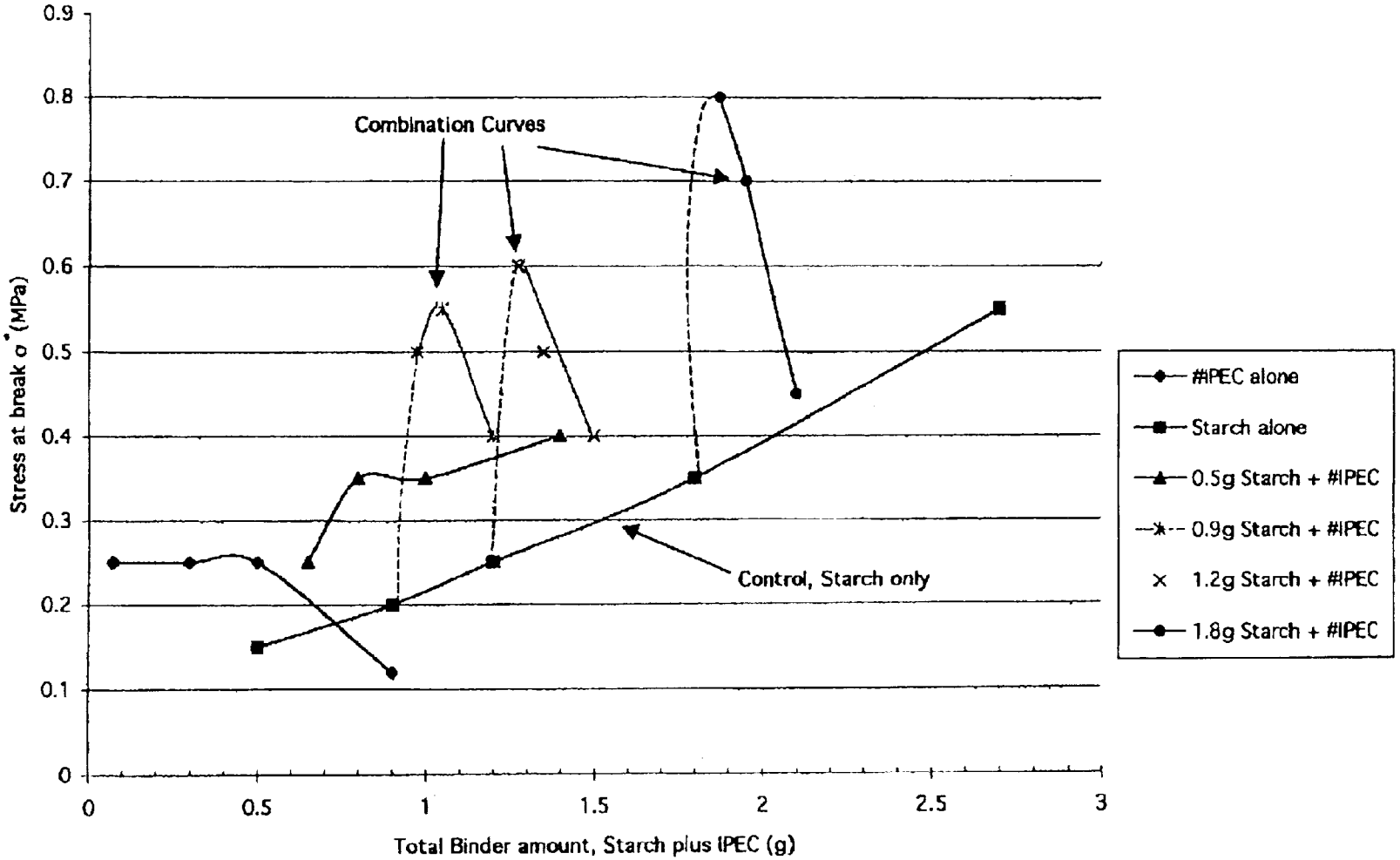
FIG. 7 is a graphical representation of the wet binding strength of starch binder and various PESC combinations having a synergistic effect.

The standard procedure of preparation of the composition was used: Newsprint (6.6 g), mineral wool (4.5 g), perlite (17.1 g), and starch (0–18 g) were mixed in 500 ml of warm (40° C.) 0.002N KCl aqueous solution under stirring. Then 300 ml of partially neutralized "Carbopol" microgel, prepared in advance, was added to the mixture under stirring. Then the predetermined amount of 0.1N aqueous solution of PDADMAC was added to make the ratio of total carboxylic groups to ammonium groups equal to 3.0. Since the carboxylic groups were previously one third neutralized, the ratio of neutralized carboxylic groups to ammonium groups thus equals 1.0. Again, an additional amount of water was added to make the total volume equal to 1000 ml. Then 0.018 g of flocculant was added last. The mixtures were filtered and prepared in the "brewing regime" as usual. The results of the mechanical testing of the samples are presented in Table 6 and FIG. 7.

TABLE 6

| Cross-linked (#) IPEC Data | | | | | |
|---|---|---|---|---|---|
| | Starch (g) | #IPEC (g) | Total binder (g) | Stress at break σ* dry (Mpa) | Stress at break σ* wet (Mpa) |
| Control 1 | 0 | 0.075 | 0.075 | 0.25 | 0.15 |
| #IPEC alone | 0 | 0.3 | 0.3 | 0.25 | 0.15 |
| | 0 | 0.5 | 0.5 | 0.25 | 0.15 |
| | 0 | 0.9 | 0.9 | 0.12 | 0.07 |
| Control 2 | 0.5 | 0 | 0.5 | 0.15 | 0.1 |
| Starch alone | 0.9 | 0 | 0.9 | 0.2 | 0.05 |
| (same data | 1.2 | 0 | 1.2 | 0.25 | 0.07 |
| as in | 1.8 | 0 | 1.8 | 0.35 | 0.1 |
| Table 3) | 2.7 | 0 | 2.7 | 0.55 | 0.25 |
| Combination | 0.5 | 0.15 | 0.65 | 0.25 | 0.2 |
| 0.5 g Starch | 0.5 | 0.3 | 0.8 | 0.35 | 0.2 |
| plus varied | 0.5 | 0.5 | 1 | 0.35 | 0.2 |
| #IPEC | 0.5 | 0.9 | 1.4 | 0.4 | 0.2 |
| Combination | 0.9 | 0.075 | 0.975 | 0.5 | 0.2 |
| 0.9 g Starch | 0.9 | 0.15 | 1.05 | 0.55 | 0.3 |
| plus varied | 0.9 | 0.3 | 1.2 | 0.4 | 0.3 |
| #IPEC | | | | | |
| Combination | 1.2 | 0.075 | 1.275 | 0.6 | 0.35 |
| 1.2 g Starch | 1.2 | 0.15 | 1.35 | 0.5 | 0.4 |
| plus varied | 1.2 | 0.3 | 1.5 | 0.4 | 0.3 |
| #IPEC | | | | | |
| Combination | 1.8 | 0.075 | 1.875 | 0.8 | 0.5 |
| 1.8 g Starch | 1.8 | 0.15 | 1.95 | 0.7 | 0.4 |
| plus varied | 1.8 | 0.3 | 2.1 | 0.45 | 0.3 |
| #IPEC | | | | | |

While Applicants have set forth embodiments as illustrated and described above, it is recognized that variations may be made with respect to disclosed embodiments. Therefore, while the invention has been disclosed in various forms only, it will be obvious to those skilled in the art that many additions, deletions and modifications can be made without departing from the spirit and scope of this invention, and no undue limits should be imposed except as set forth in the following claims.

What is claimed is:

1. A polymer binder for a fibrous sheet comprising:

a polyanion having a negative charge of between about 4 to about 12 milliequivalents per gram; and polycation having a positive charge of between about 6 to about 12 milliequivalents per gram.

2. The binder of claim 1, wherein the polyanion has a plurality of negatively charged anionic groups and the polycation has a plurality of positively charged cationic groups, the molar ratio of total negatively charged anionic groups to total positively charged cationic groups being between about 10:1 and about 1.1:1.

3. The binder of claim 2, wherein the negatively charged anionic groups are acids.

4. The binder of claim 3, wherein the anionic acid groups are weakly acidic.

5. The binder of claim 2, wherein the positively charged cationic groups are amines.

6. The binder of claim 2, wherein the molar ratio of total negatively charged anionic groups to total positively charged cationic groups is about 3:1.

7. The binder of claim 1, wherein the molecular weight of the polyanion is between about 10,000 to about 900,000 grams per mole.

8. The binder of claim 1, wherein the polyanion is crosslinked.

9. The binder of claim 1, wherein the polyanion has a plurality of negatively charged anionic groups, the total negatively changed anionic groups having a cross-link ratio of up to about 1:50.

10. The binder of claim 1, wherein the molecular weight of the polycation is between about 10,000 to about 900,000 grams per mole.

11. The binder of claim 1, wherein the binder forms a interpolyelectrolyte complex.

12. The binder of claim 1, wherein the binder further comprises a spacer [selected from the group consisting of a polysaccharide, a hydrogel, a latex and combinations thereof].

13. The binder of claim 1, wherein the [polysaccharide] binder further comprises a starch spacer.

14. The binder of claim 1, wherein the binder further comprises a surfactant.

15. The binder of claim 14, wherein the surfactant is selected from the group consisting of alkylamines, fatty amines and combinations thereof.

16. The binder of claim 1, wherein the polyanion to polycation charge ratio is about 1:1.

17. The binder of claim 1, wherein the polyanion is selected from the group consisting of polycarbohydrates, polyphosphates, polysulfonates, polysulfates and combinations thereof.

18. The binder of claim 1, wherein the polycation is a polyamine.

19. The binder of claim 18, wherein the polyamine is a quaternary amine.

20. The binder of claim 1, wherein the polycation has a positive charge of between 6 to about 12 milliequivalents per gram.

*21. The binder of claim 12, wherein the spacer is selected from the group consisting of a polysaccharide, a hydrogel, a latex and combinations thereof.*

*22. A polymer binder for a fibrous sheet comprising:*

*a spacer; and*

*an interpolyelectrolyte complex, the interpolyelectrolyte complex being formed around the spacer.*

*23. The polymer binder of claim 22, wherein the interpolyelectrolyte complex includes a two-part polymer additive, the two-part polymer additive including a polyanion and a polycation, wherein the ratio of polyanion to polycation is between 10:1 and 1.1:1.*

*24. The polymer binder of claim 22, wherein the binder further includes a surfactant, the interpolyelectrolyte complex and surfactant form a polyelectrolyte-surfactant complex, wherein the polyelectrolyte-surfactant complex is formed around the spacer.*

*25. A polymer binder for a fibrous sheet comprising:*

*a polyanion;*

*a polycation; and*

*a surfactant;*

*wherein the polyanion, polycation and surfactant form a polyelectrolyte-surfactant complex.*

*26. The polymer binder of claim 25, wherein the ratio of polyanion to polycation is between 10:1 and 1.1:1.*

* * * * *